Figure 1:
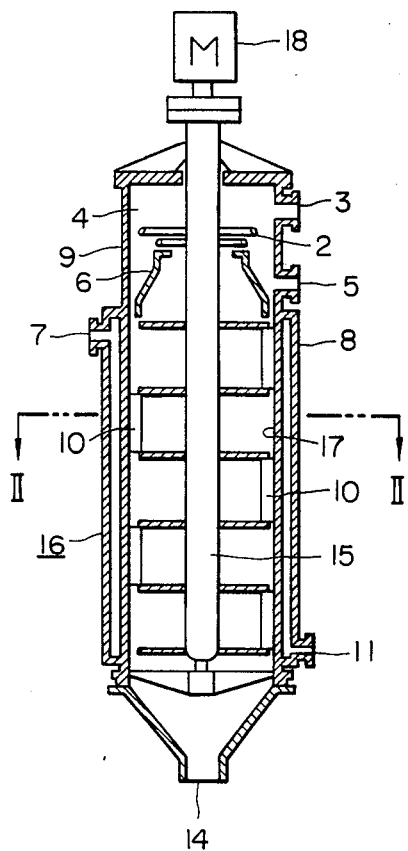

United States Patent [19]

Chino et al.

[11] Patent Number: 4,526,713

[45] Date of Patent: Jul. 2, 1985

[54] PROCESS AND SYSTEM FOR TREATMENT OF RADIOACTIVE WASTE

[75] Inventors: Koichi Chino, Hitachi; Kazuhiko Kudo, Ibaraki; Akira Oda, Hitachi; Hideichi Mura, Tokai; Yoshiyuki Takamura, Kudamatsu, all of Japan

[73] Assignee: Hitachi, Ltd., Tokyo, Japan

[21] Appl. No.: 224,110

[22] Filed: Jan. 12, 1981

[30] Foreign Application Priority Data

Jan. 10, 1980 [JP] Japan .................................... 55-1873

[51] Int. Cl.³ .............................................. G21F 9/08
[52] U.S. Cl. ............................ 252/632; 159/DIG. 12; 159/6.2
[58] Field of Search ....... 252/632; 159/6 W, DIG. 12

[56] References Cited

U.S. PATENT DOCUMENTS 4,279,692 7/1981 Chino et al. .................... 159/6 W
4,290,907 9/1981 Horiuchi et al. ..................... 252/632

FOREIGN PATENT DOCUMENTS 54-104648 8/1979 Japan ................................. 252/632
54-160564 12/1979 Japan ................................. 159/6 W

*Primary Examiner*—Deborah L. Kyle
*Attorney, Agent, or Firm*—Antonelli, Terry & Wands

[57] ABSTRACT

In a treatment system of radioactive waste solution including sodium sulfate generated from a boiling water type nuclear reactor, waste solution is fed into a thin film evaporator where the waste solution is evaporated and made into powder while precipitating in a peripheral surface of the evaporator vessel. The surface of the precipitated solid is wiped by rotating wiper blades and removed off as radioactive solid powder. The rotational speed of a rotor to which the wiper blades are secured is controlled at a minimum and necessary rotational speed which contributes to make the waste solution into the powder so that the rate of worn out of the wiper blade is decreased.

12 Claims, 6 Drawing Figures

PROCESS AND SYSTEM FOR TREATMENT OF RADIOACTIVE WASTE

The present invention relates to a process and system for treatment of radioactive waste, and more particularly to a process and system for treatment of radioactive waste which employ a thin film evaporator for drying the waste liquid into powder.

Various radioactive wastes are generated from radioactive material handling facilities such as nuclear power plant. For example in a boiling water type nuclear reactor plant, radioactive waste liquid is produced as a result of regeneration of ion exchange resin, which is mainly composed of sodium sulfate. In order to reduce the volume of the resultant radioactive waste liquid, the waste liquid is concentrated about 20 weight percent, and thereafter is made into powder by a thin film evaporator. In the thin film evaporator, the waste liquid evaporates on a heat transfer surface and powders are obtained by wiping thin films formed on the heat transfer surface.

The film evaporator is advantageous for obtaining higher heat transfer coefficient because no scale of thin film remains on the heat transfer surface, which is formed on the heat transfer surface and acts as heat transfer resistance. However, as wiper blades which wipe thin film are rotating while acting forces on the heat transfer surface, the tip portions of the wiper blades wear so quickly as to cause reduction of heat transfer coefficient due to insufficient wiping effect. As a result, worn out wiper blades are frequently exchanged for new ones, however, frequent exchanges of the blades cause reduction of operating rate of the film evaporator.

An object of the present invention is to provide an improved process and system for treatment of radioactive waste, which employs a thin film evaporator with an improved operating condition.

According to one feature of the present invention, radioactive substances dissolved in a waste liquid is separated as powder by a thin film evaporator having wiping blades. Optimum operating condition of the evaporator is obtained by controlling rotational speed of the wiping blades and quantity of the radioactive substances treated in the evaporator. By operating the evaporator at the optimum operating conditions, worn out of the wiper blades and over load of waste liquid on the evaporator are advantageously eliminated.

According to a preferred embodiment of the present invention, the rotational speed of the wiping blades is controlled in accordance with evaporation characteristics between the rotational speed and radioactive substances to be powderized.

According to another embodiment of the present invention, the rotational speed of the wiping blades is fixed at a predetermined value and flow rate of the waste liquid and the concentration of the radioactive substances are controlled to obtain an optimum operation condition.

Figure 2:
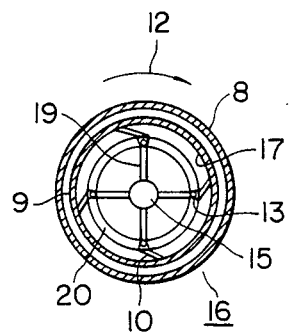
Figure 3:
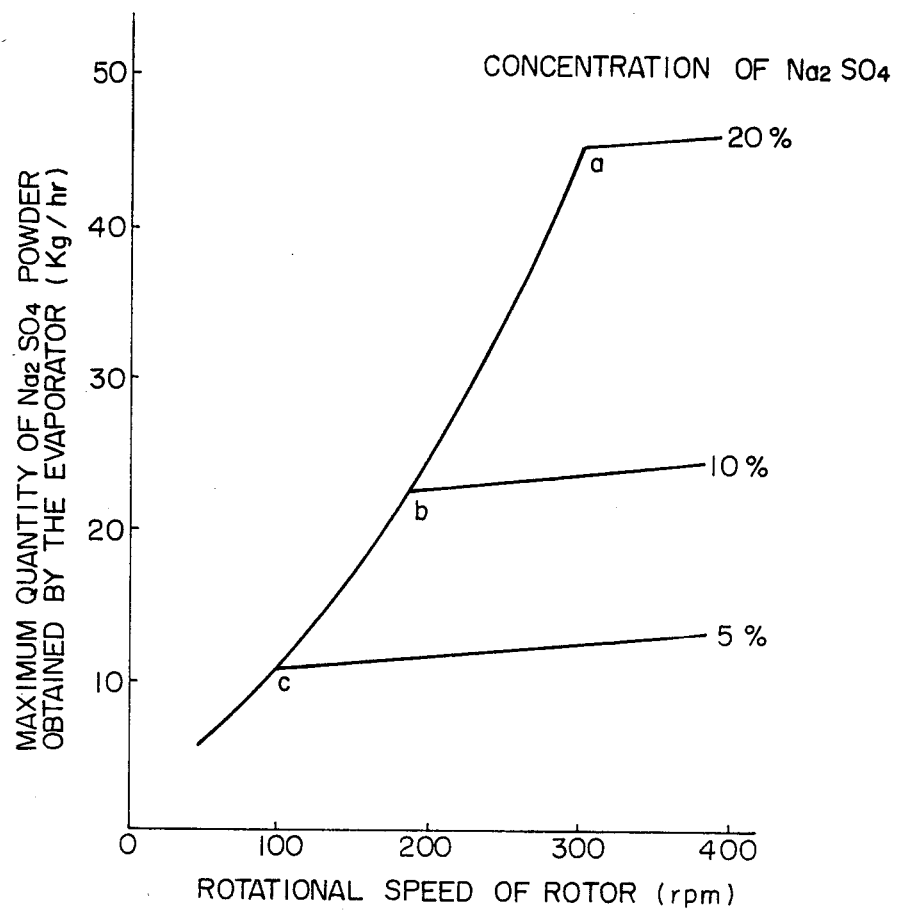
Figure 4:
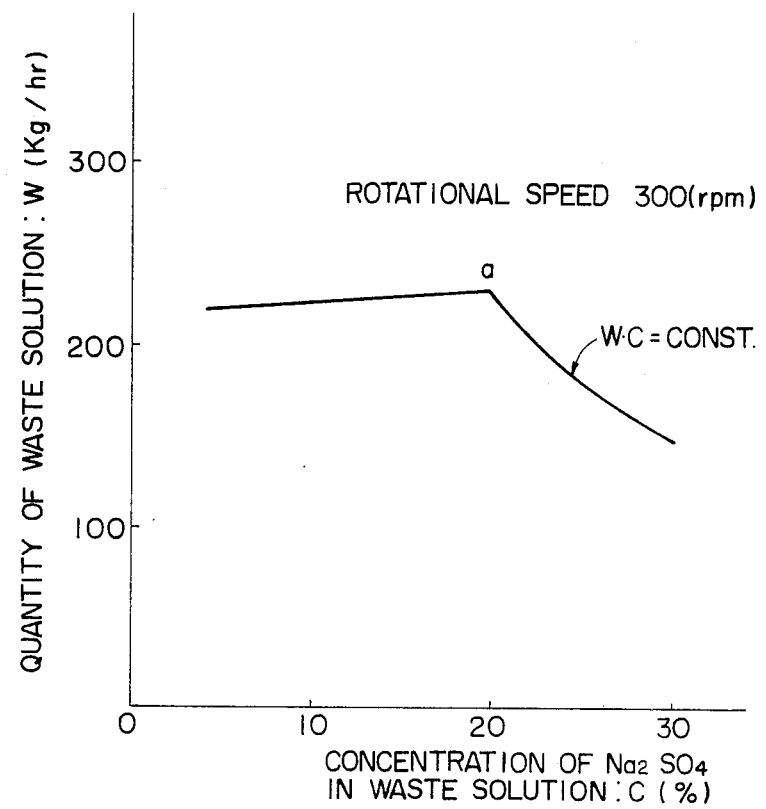
Figure 5:
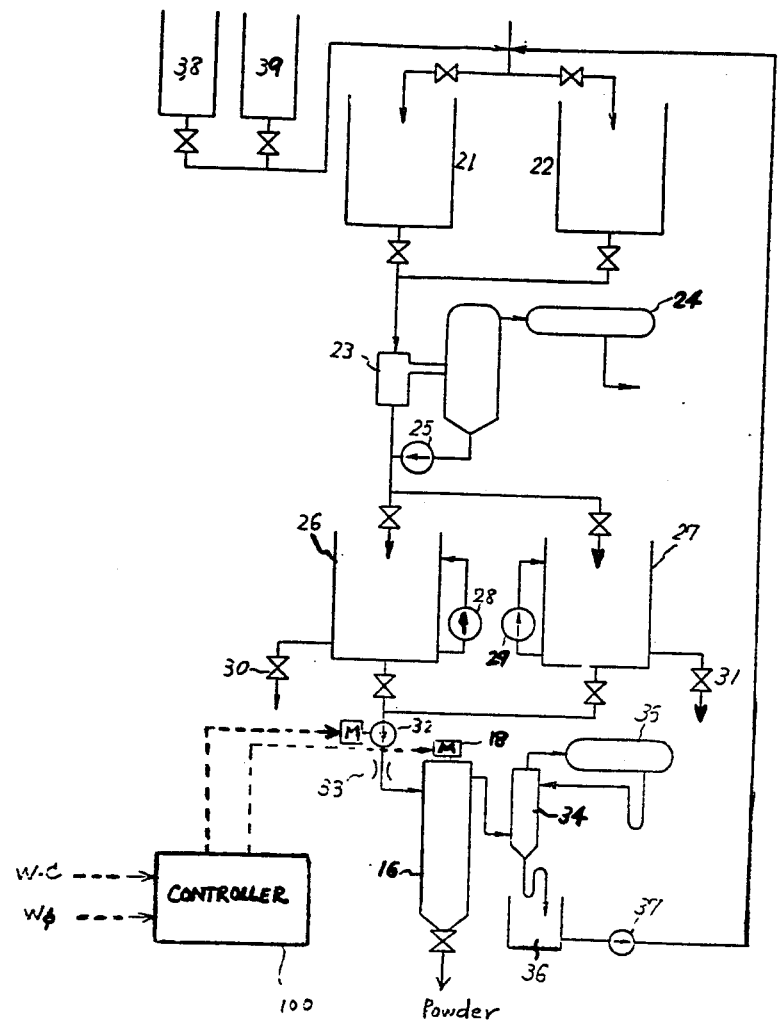
Figure 6:
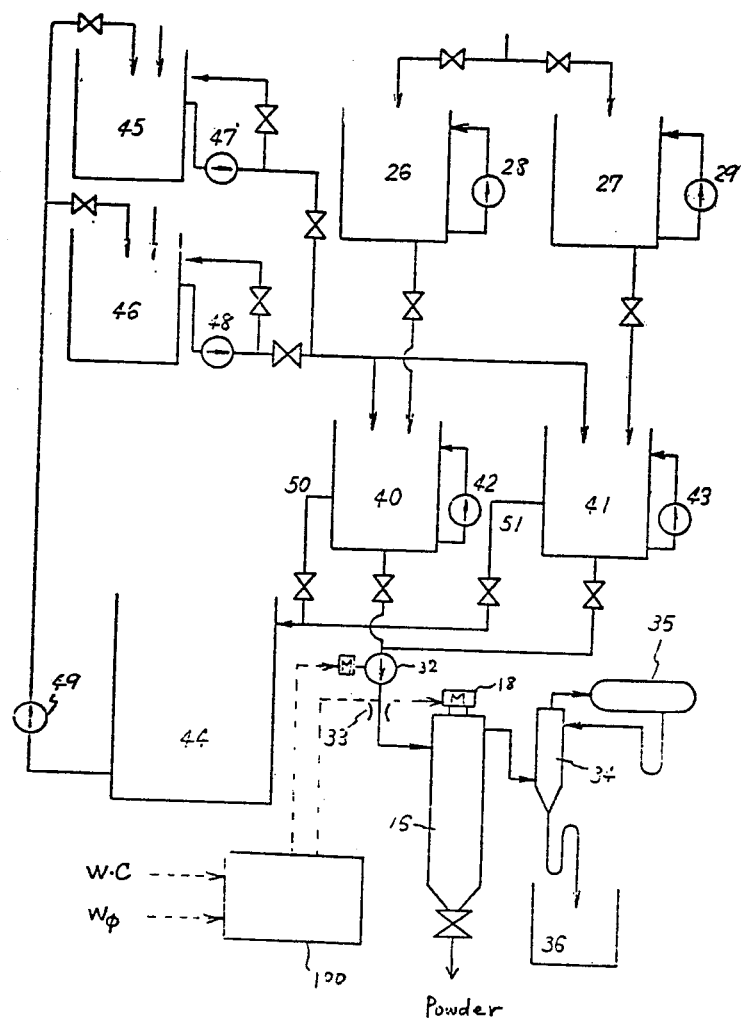

FIG. 1 is a vertical cross-section view of a thin film evaporator in accordance with the present invention, FIG. 2 is a cross-section view of the thin film evaporator taken along a line III—III of FIG. 1, FIG. 3 is a characteristic diagram showing a relation between the rotational speed of the rotor and the maximum quantity of $Na_2SO_4$ powder obtained by the evaporator, FIG. 4 is a characteristic diagram showing a relation between the concentration of $Na_2SO_4$ in the waste solution and the quantity of waste solution, FIG. 5 is a flow diagram showing one embodiment of the present invention, FIG. 6 is a flow diagram showing another embodiment of the present invention.

Hereafter, preferred embodiments of the present invention will be explained with reference to drawings of FIGS. 1 to 4.

The thin film evaporator 16 has an elongated cylindrical vessel 9 and a rotor 15 rotatably arranged in the center of the vessel 9. The rotor 15 is divided into a plurality of stages in the axial direction and provided with a plurality of wiper blades 10. In the upper portion of the vessel 9, there are provided a steam outlet 3 and a waste liquid inlet 5. In the lower portion of the vessel 9, there is provided a powder outlet 14. A mist separator 2 and a distributor 6 are carried on the rotor 15 in the vapor chamber 4. A jacket 8 having a heating medium inlet 7 and outlet 11 is provided around the vessel 9. The wiper blades 10 are rotatably fixed, by means of pins 13, to support rings 20, which are fixed to the rotor 15 by support arms 19.

The waste liquid, including radioactive substances composed of mainly sodium sulfate in the case of a boiling water reactor, is fed into the vessel 9 of the evaporator 16 through the inlet 5. The concentration of the sodium sulfate in the liquid fed to the evaporator is preset about 20% by weight. The waste liquid fed into the evaporator uniformly flows down the vessel by means of the distributor 6. As the rotor 15 is driven by a motor 18, the waste liquid is urged against inner peripheral surface 17 of the vessel 9 by the effect of wiper blades 10 which move along the surface 17 in a direction of arrow 12 while pressed to the surface 17 by centrifugal force. In this way, the waste liquid is formed into a thin liquid film on the surface 17. The solution in the liquid film is deposited by the heat of heating medium (steam about 170° C.) flowing in the jacket 16. The inner peripheral surface 17 is a heat transfer surface. The liquid film is further concentrated and becomes slurry state. As the concentration proceeds, the slurry film is further dried and secures on the surface 17 like a scale which will be heat resistant. Deposition of solid scale is prevented by the movement of the wiper blades 10. The tip portion of the wiper blades 10 wipes out the solid scale deposited on the surface 17 as a solid powder of radioactive substances such as sodium sulfate, which will be disposed out from the outlet 14.

In the thin film evaporator described above, it was believed that the heat transfer coefficient at the heat transfer surface generally increases with the increase of the rotational speed of the rotor. However, it is found by the present inventors that quantity of solid powder obtained by the thin film evaporator does not increase so much above a certain level even if the rotational speed of the rotor increases as shown in FIG. 3. That is, quantity of solid powder obtained by the thin film evaporator is determined theoretically along a curve a-b-c, which means that the amount of waste liquid that can be supplied and powderized depends less on the rotational speed of the rotor. This is because the wall of the vessel 9 is so thick as to increase the heat resistance as compared with the usual heat exchanger. Therefore, improvement of heat transfer coefficient by the wiper 10 does not effect as much as had been expected. The curve a-b-c is determined by calculating the heat energy necessary to evaporator the water content in the waste liquid by the following equation;

$$W\phi(1 - C) = \frac{S \cdot \alpha \cdot \Delta T}{(H_l + C_s)T_s}$$

in which;

$W\phi$: amount of solution supplied to the evaporator—[kg/hr]
C: concentration of solute in the solution—[weight %]
S: area of heat transfer surface—[m²]
$\alpha$: heat transfer coefficient—[kcal/m².°C.hr]
$\Delta T$: temperature differences between heating medium and saturating temperature of the solution—[°C]
$H_l$: latent heat of water
$C_s$: specific heat of water
$T_s$: temperature differences of solution between the inlet of the evaporator and saturating temperature—[°C]

In the case of experiments made by the inventors, the quantity of sodium sulfate (Na₂SO₄) obtained as powder is about 45, 22 and 11 [kg/hr] respectively in the case where the concentration of sodium sulfate in the waste liquid are 20, 10 and 5 [weight %] (respectively corresponding to critical points a, b and c). After reached those critical points a, b and c, the quantity of powder obtained by increasing the rotational speed of the rotor increases but the rate of increase is not so high as compared with the increase of the rotational speed. This means that in the characteristics of the evaporation there are two regions, one in which the quantity of powder obtained depends on the rotational speed and another in which the quantity depends less upon the rotational speed of the rotor. In the former region, the quantity of powder obtained does not change even if the concentration of the solute changes and can not exceed the quantity determined by the rotational speed. On the other hand, the quantity of powder obtained changes in the latter region depending upon the concentration of the solute in the solution. If the concentration of the solute becomes lower, the amount of water to be evaporated increases in inverse proportion to the concentration of the solute, resulting to decrease the maximum quantity of powder obtained by the evaporation as illustrated in FIG. 3.

In the case of the boiling water type nuclear reactor power plant, the amount of waste liquid necessary to be treated by the thin film evaporator varies as much as 400% as compared with average amount per month, due to the change in the operating condition of the power plant. Also, it is found by the present inventors that the amount of wear on the wiper blade increases about in proportion to the cube of the rotational speed of the rotor. This is because, the contacting pressure between the wiper blade and the heat transfer surface increases in proportion to the square of the rotational speed of the rotor and the peripheral speed of the rotor increases in proportion to the rotor speed.

Therefore, in order to prevent the lowering of the operating rate of the evaporator due to the change in length of the wiper blades, it is preferable to control the rotational speed of the rotor of the evaporator in accordance with the amount of waste solution supplied to the evaporator and the coefficient of the solute in the solution. For example, on the critical point a, where the concentration of the solute is 20 weight % and the rotational speed is 300 rpm, if the rotational speed is increased, the worn out of the wiper blade proceeds rapidly, however, the quantity of powder obtained will not increase as compared with the increase rate of rotational speed. Therefore, it is preferred to operate the evaporator about the rotational speed corresponding to the critical point if the quantity of the solute to be powderized is exceeding the quantity of powder obtained corresponding to the critical point so as to keep the rating of wearing the wiper blade at a minimum. Or, otherwise to operate the evaporator at a lower rotating speed than the critical speed by decreasing the quantity of solute supplied to the evaporator, for example by employing an accumulating tank for accumulating excessive quantity of solution. If the quantity of the solute in the solution is less than the critical amount, it is preferred to control the rotational speed of the rotor such that the rotational speed may be the minimum speed necessary for the evaporation of the solution, which rotational speed is given by the curve a-b-c shown in FIG. 3.

In the case where the rotational speed of the rotor is not controllable, it is preferred to control the quantity of solute in the solution be a constant value as is illustrated in FIG. 4. In this embodiment, the rotational speed is not controllable but fixed at 300 rpm. If the concentration of the solute in the solution is lower than the critical point of 20 weight %, it is possible to treat the waste solution at a rate about 220 kg/hr to 230 kg/hr. However, if the concentration exceeds 20 weight %, it is necessary to decrease the amount of solution supplied to the evaporator such that the rate of solute in the solution to be powderized be constant at about 46 kg/hr, so that the amount of solution supply does not exceed maximum ability for the evaporation.

Hereafter, description of a preferred embodiment will be made with reference to FIG. 5. Ion exchange resin which is equipped in a desalter as a filter for purifying coolant water of the nuclear reactor is regenerated, when the purifying ability decreases by sodium including sodium hydroxide and sulfuric acid. The regeneration liquid including the sodium hydroxide and sulfuric acid is stored in waste liquid storage tanks 21 and 22. These storage tanks have the storage capacity of that amount of waste liquid produced in 30 days, and, if one exceeds its capacity, the other is used alternately by switching valves. pH of the regeneration liquid is adjusted by adding sodium hydroxide or sulfuric acid respectively from tank 38 and tank 39. The regeneration liquid is then introduced in a condenser 23 where the regeneration liquid is enriched while circulating by a pump 25. Vapor generated is condensed in a condenser 24 and returned to a coolant system if the radioactivity is lower than a predetermined allowable level. The enriched regeneration liquid is exhausted into a receiving tank 26 or 27 if the concentration of sodium sulfate is higher than 20% by weight. One of measures for detecting the concentration of the sodium sulfate is by measuring the density of the waste liquid. However, the detected value includes errors by inclusion of ferrous rust or sand in the waste liquid. In order to detect a correct value concentration, it is preferable to detect the concentration of sodium sulfate by chemical analysis of the waste liquid which is stored in the receiving tanks 26 or 27 for a certain period of time and sampled therefrom through valves 30 or 31. In the chemical analysis the sample waste liquid is placed in a laboratory. The sample waste liquid is filtered and the filtrate is diluted. Then the concentration of sodium sulfate is measured by detecting sodium ion. Undissolved substances on the filter is dissolved by proper acid and the amount of ferrous rust is detected by measuring ferrous material in the solution by atomic absorption method. Further, by detecting the amount which is not dissolved even by adding acid, the amount of sand can be calculated. In this way, the concentration of sodium sulfate is correctly measured.

The enriched liquid in receiving tanks 26 and 27 is circulated by pumps 28 and 29 so that undissolved ferrous rust or sand may not precipitate in the tanks. The enriched waste liquid is introduced into the thin film evaporator 16 by a pump 32. Flow rate of the enriched waste liquid is detected by a magnetic flow meter 33. From the concentration of sodium sulfate (C) and the flow rate (W), the quantity of sodium sulfate (W·C) can be calculated, which signal obtained by the calculation is given to a controller 100. Also, from the graph shown in FIG. 3, the critical quantity of sodium sulfate (W$\phi$), at a particular concentration such as point a, b or c, is given to the controller 100. From this information, if the quantity of sodium sulfate supplied to the evaporator (W·C) is smaller than the critical quantity (W$\phi$), then the flow rate of the waste liquid (W) is reduced so that the quantity of sodium sulfate (W·C) may be smaller than the critical quantity (W$\phi$). And, the rotational speed of the rotor of the evaporator is adjusted by controlling the rotational speed of the motor 18 such that the rotational speed of the rotor will be the smallest speed necessary at the quantity of the sodium sulfate as defined by the curve a-b-c in FIG. 3. For example, if the quantity of sodium sulfate (W·C) is 30 kg/hr at the concentration of 10%, and the critical quantity (W$\phi$) is about 23 kg/hr, then the flowrate (W) is reduced so that the actual quantity (W'·C) may be a little larger or smaller than the critical quantity of 23 kg/hr. In this case, the rotational speed is adjusted about a speed corresponding to the actual quantity (W'·C) in accordance with the curve a-b-c. In this way, the operational point can be controlled in the vicinity of the curve a-b-c and unnecessary over speed of rotation or over supply of sodium sulfate can be prevented. in maintaining an optimum operation point, it may also be possible to control the concentration of sodium sulfate so that the actual quantity of sodium sulfate (W·C) may be smaller than the critical quantity (W$\phi$). In this case, the rotor speed is adjusted in the same way as described above. Also, as shown in FIG. 4, it may be possible to preset the rotational speed at a constant speed. In this case, an optimum operation point can be obtained by controlling the flowrate (W) or concentration (C) so that the flow rate (W) may be controlled along the curve shown in FIG. 4.

Vapor generated in the evaporator 16 is condensed in a condensor 35. A mist separator 34 is provided between the evaporator 16 and the condensor 35 for the prevention of adhesion of scale on a heat transfer tube of the condensor 35. Condensed water is received in a tank 36 and returned to the tanks 21 and 22 via pump 37.

FIG. 6 shows another embodiment of the present invention in which the present invention is used for a treatment of granular waste resin or filter agent. The same numerals show the same functions as in FIG. 5. In tanks 45 and 46, the waste resin and filter agent generated in about 3 years can be storaged. They have a concentration of about 40% by weight, however, because of other factors, such as transportation, the concentration of their waste is usually lowered less than 10% by weight. Therefore, their waste is mixed with other enriched waste solution. At first, water in a mixed water tank 44 is supplied into the tanks 45 and 46 via pump 49 for adjusting the concentration of slurry, which is in the upper portions of the tanks 45 and 46, less than 10% weight. The slurry is supplied to tanks 40 and 41 where slurry produced over 10 days can be storaged and is precipitated for 3 days. Only upper portions in the tanks 40 and 41 are sent to a tank 44. Thereafter, 15% by weight of enriched waste liquid in the tank 26 and 27, and 8 weight % of waste resin are prepared in the mixing tanks 40 and 41. Mixing is made by pumps 42 and 43. After chemical analysis has finished, slurry in a uniform concentration is supplied via pump 32 to the evaporator 16. Operation of the evaporator is made the same as described with reference to FIG. 5.

We claim:

1. A process for treatment of waste liquid material including dissolved radioactive substances, comprising:
    heating the waste liquid material to vaporize the liquid and to deposit said radioactive substances on a heat transfer surface;
    wiping the radioactive substances deposited on the heat transfer surface to form a dry powder by rotary wiping blades;
    measuring the flow rate (W) of the entering waste liquid material and the concentration (C) of the radioactive substances to be powdered in the waste liquid material, thus determining the quantity of the radioactive substances to be powdered by the product of (W×C); and
    controlling the rotational speed of the wiping blade in accordance with the quantity of the radioactive substances to be powdered.

2. A process according to claim 1, wherein the rotational speed is controlled at a minimum speed necessary for powderizing the radioactive substances to be treated.

3. A process according to claim 1 or 2, wherein the rotational speed changes in proportion to the rate of change in the maximum quantity of radioactive substances to be powdered.

4. A process according to claim 3, wherein evaporation of the liquid and depositing of the radioactive substances on a heat transfer surface changes from a point where the maximum quantity of the radioactive substances to be powderized increases effectively with the increase of the wiping speed to a point where the maximum quantity of the radioactive substances to be powderized increases at a negligible rate with the increase of the wiping speed.

5. A process according to claim 4, further comprising steps of detecting a quantity of the waste liquid material to be treated and detecting a concentration of the radioactive substances in the waste liquid material.

6. A process according to claim 5, further comprising a step of calculating the maximum quantity of radioactive substances to be treated by an equation of thermal balance of heat energy required to vaporize water content in the waste liquid material and heat energy supplied for heating.

7. A process according to claim 3, further comprising steps of detecting a quantity of the waste liquid material to be treated and detecting a concentration of the radioactive substances in the waste liquid material.

8. A process according to claim 7, further comprising a step of calculating the maximum quantity of radioactive substances to be treated by an equation of thermal balance of heat energy required to vaporize water content in the waste liquid material and heat energy supplied for heating.

9. A process according to claim 1, wherein the wiping speed is kept constant and the flow rate of the waste liquid material and the concentration of the radioactive substances to be powderized in the waste liquid material are controlled to obtain an optimum operation condition.

10. A process according to claim 9, further comprising steps of detecting a quantity of the waste liquid material to be treated and detecting a concentration of the radioactive substances in the waste liquid material.

11. A system for treatment of waste liquid material including dissolved radioactive substances comprising a film evaporator having a cylindrical vessel with an inlet and outlet for the waste liquid material heating means for heating the waste liquid material in said vessel through a cylindrical heat transfer surface of said vessel to vaporize the liquid and to deposit said radioactive substances on the heat transfer surface, wiping means for wiping said heat transfer surface to remove the radioactive substances depositing thereon to obtain dry powder of the radioactive substances, measuring means for measuring the flow rate (W) of the entering waste liquid material and the concentration (C) of the radioactive substances to be powdered in the waste liquid material and determining the quantity of the radioactive substances to be powdered by the product of (W×C); and control means for controlling the wiping speed of said wiping means in accordance with the quantity of the radioactive substances to be powdered.

12. A system according to claim 11, further comprising detecting means for the quantity of the radioactive substances.

* * * * *